United States Patent [19]

Berges

[11] 4,400,872
[45] Aug. 30, 1983

[54] METHOD OF AND APPARATUS FOR SKEWING A STACK OF LAMINATIONS

[75] Inventor: David E. Berges, Fort Wayne, Ind.

[73] Assignee: General Electric Company, Fort Wayne, Ind.

[21] Appl. No.: 292,526

[22] Filed: Aug. 13, 1981

[51] Int. Cl.³ .......................................... H02K 15/02
[52] U.S. Cl. ...................................... 29/598; 29/732; 29/738; 29/596; 414/27; 414/28
[58] Field of Search .................. 29/596, 598, 609, 732, 29/736, 738; 414/27, 28, 36

[56] References Cited
U.S. PATENT DOCUMENTS

| | | | |
|---|---|---|---|
| 1,408,890 | 3/1922 | Kimble | 29/609 X |
| 2,199,623 | 5/1940 | Elsey | 29/736 |
| 2,933,204 | 4/1960 | Ebbert | 414/27 X |
| 2,980,267 | 4/1961 | Kalish | 414/27 |
| 3,344,514 | 10/1967 | Partlow et al. | 29/609 X |
| 3,802,068 | 4/1974 | Scott | 29/598 |

Primary Examiner—Carl E. Hall
Attorney, Agent, or Firm—Joseph E. Papin

[57] ABSTRACT

A method of operating apparatus adapted for skewing a stack of laminations. In this method, one opposite end face of the stack is disposed on supporting means therefor, and skewing means pivotally associated with the supporting means is passed through passage means of the stack with a part of the skewing means extending beyond the other opposite end face of the stack. A rocker arm is associated with the other opposite end of the stack to initiate pivoting of the rocker arm generally about a pivotal arrangement with a means for carrying it, and the rocker arm is moved during its pivoting to engage the skewing means part so as to pivotally displace the skewing means from an at-rest position toward a displaced position thereby to effect the skewing of the laminations of the stack.

Apparatus adapted for imparting skew to a stack of laminations is also disclosed.

20 Claims, 8 Drawing Figures

METHOD OF AND APPARATUS FOR SKEWING A STACK OF LAMINATIONS

FIELD OF THE INVENTION

This invention relates in general to dynamoelectric machines and in particular to apparatus and methods for imparting skew to a stack of ferromagnetic laminations adapted for use in such dynamoelectric machines.

BACKGROUND OF THE INVENTION

In the past, many different methods utilizing various different apparatus have been employed to effect the skewing of a stack of ferromagnetic laminations adapted for use in either a rotor or a stator of a dynamoelectric machine. In one of such past methods, the laminations of the stack were assembled on a mandrel for holding the stack, and at least one rather small passage adjacent the stack periphery was aligned so as to extend through the stack between a pair of opposite end faces thereof. When so assembled on the mandrel, one of the opposite end faces of the stack was seated on a base plate having an opening therein generally aligned with the mandrel, and during the seating of the stack, a skewing pin was inserted into the passage of the stack so as to be arranged at least adjacent or in abutment with the laminations of the stack within the passage therethrough. Of course, since the passage through the stack was rather small, as previously mentioned, the diameter of the skewing pin was necessarily also rather small. The skewing pin was pivotally mounted to the base plate and had a lower end extending therethrough adjacent a side of the base plate opposite that on which the stack was seated. In order to impart skew to the stack, a force was applied by suitable means onto the lower end of the skew pin beneath the base plate thereby to effect a preselected amount of pivoting or pivotal movement of the skewing pin about its pivotal mounting arrangement with the base plate. Of course, this pivoting movement of the skewing pin resulted in the skewing of the laminations of the stack through the engagement therewith of the skewing pin within the passage of the stack between the opposite end faces thereof. Subsequent to the above discussed skewing of the stack, a pressure pad was advanced into abutment with the other of the opposite end faces of the stack thereby to capture it between the pressure pad and the base plate in order to compress the stack which, of course, maintains the laminations of the stack in their skewed positions, and a tight pin previously associated with the mandrel was driven into displacement preventing engagement with the laminations of the stack while displacing the mandrel from the stack through the opening in the base plate. The pressure pad was retracted from its engagement with the stack, and the stack with the tight pin associated therewith was removed from the base plate and the skewing pin thereon. Of course, the tight pin retained the laminations of the stack in their skewed positions upon the removal of the stack and tight pin from the base plate. While the above discussed past method of imparting skew to the stack and the apparatus utilized therein may have had many salient features, it is believed that one of the disadvantageous or undesirable features thereof was that many of the skewing pins were broken due to the rather small size or diameter thereof particularly during the skewing of stacks of longer or greater stack heights. Of course, an ancillary disadvantageous or undesirable feature of the above discussed past method and apparatus is believed to be that the breakage of the skewing pins may have resulted in greater down time of such apparatus in order to replace such broken skewing pins which is also believed to have reduced production of such stacks. Further, another disadvantageous or undesirable feature of such above discussed past method and apparatus is believed to be that the proper amount of skew was not always imparted to the laminations of the stack since the skewing pins often deformed or were bent within their elastic limits during the skewing process when pivoted in response to the force applied thereon. In the event of the above discussed deformation of the skewing pins, it is believed that the angle of skew of at least some of the laminations at least adjacent the upper or other opposite end face of the stack may have been less than at least some of the other laminations adjacent the one opposite end face of the stack seated on the base plate of the skewing apparatus.

In some instances in the past, it is believed that a plurality of welds were laid across the stack while it was captured or otherwise compressed between the pressure pad and base plate, as discussed above, thereby to fixedly retain the laminations of the stack in their skewed positions; however, if such welds were applied, it is believed that the insertion of the tight pin into displacement preventive engagement with the laminations in order to maintain them in their skewed position may not have been necessary.

SUMMARY OF THE INVENTION

Among the several objects of the present invention may be noted the provision of improved apparatus adapted for imparting skew to a stack of laminations and also an improved method of operating such apparatus which overcome at least the aforementioned disadvantageous or undesirable features, as well as others, of the prior art; the provision of such improved method and apparatus which insures a preselected angle of skew between the laminations defining the opposite end faces of the stack; the provision of such improved method and apparatus having an adjustable skewing means pivotally associated with a supporting means for the stack; the provision of such improved method and apparatus utilizing a pivotal rocker arm means for driving engagement with the skewing means to impart the skew to the laminations of the stack; the provision of such improved method and apparatus in which the rocker arm means has a preselected pivot arm or pivotal length correlative with a preselected skew imparted to the stack; and the provision of such improved method and apparatus in which the component parts utilized therein are simplistic in design, easily assembled and economically manufactured. These as well as other objects and features of the present invention will be in part apparent and in part pointed out hereinafter.

In general, a method in one form of the invention is provided for operating apparatus adapted for skewing a stack of laminations with the stack having at least one passage therethrough. The apparatus includes seating means for supporting the stack, at least one means pivotally associated with the supporting means and extending through the at least one passage for skewing the stack with the at least one skewing means having a free end protruding from the at least one passage beyond the stack when it is supported on the seating means, and at least one rocker arm means arranged for reciprocal and pivotal movement with respect to the stack. In this method, the at least one rocker arm means is moved in one direction toward the stack, and a part of the at least one rocker arm means is engaged with the stack at least adjacent the free end of the at least one skewing means to initiate the pivotal movement of the at least one rocker arm means. The at least one rocker arm means is pivoted into driving engagement with the free end of the at least one skewing means to effect its pivotal displacement thereby to skew the stack, and the at least one rocker arm means part is maintained in its engagement with the stack at least during the pivotal displacement of the at least one skewing means by the at least one rocker arm means.

Also in general and in one form of the invention, apparatus is provided for imparting skew to a stack of laminations having a pair of opposite end faces and at least one opening therein intersecting with the opposite end faces, respectively. The apparatus has means for supporting the stack, and means pivotally mounted to the supporting means and extending through the at least one opening of the stack for skewing it includes a free end protruding from the at least one opening beyond the stack. Means for reciprocal movement with respect to the supporting means includes at least one means pivotally arranged with the reciprocal movement means for driving engagement with the free end of the at least one skewing means to effect the pivotal movement thereof and impart the skew to the stack during at least a part of the movement in the one direction of the reciprocal movement means.

The exemplifications set out herein illustrate the preferred embodiment of the present invention in one form thereof, and such exemplifications are not to be construed as limiting the scope of the invention in any manner.

DETAILED DESCRIPTION OF THE PREFERRED EMBODIMENT

Figures 1, 2, 3, 4:
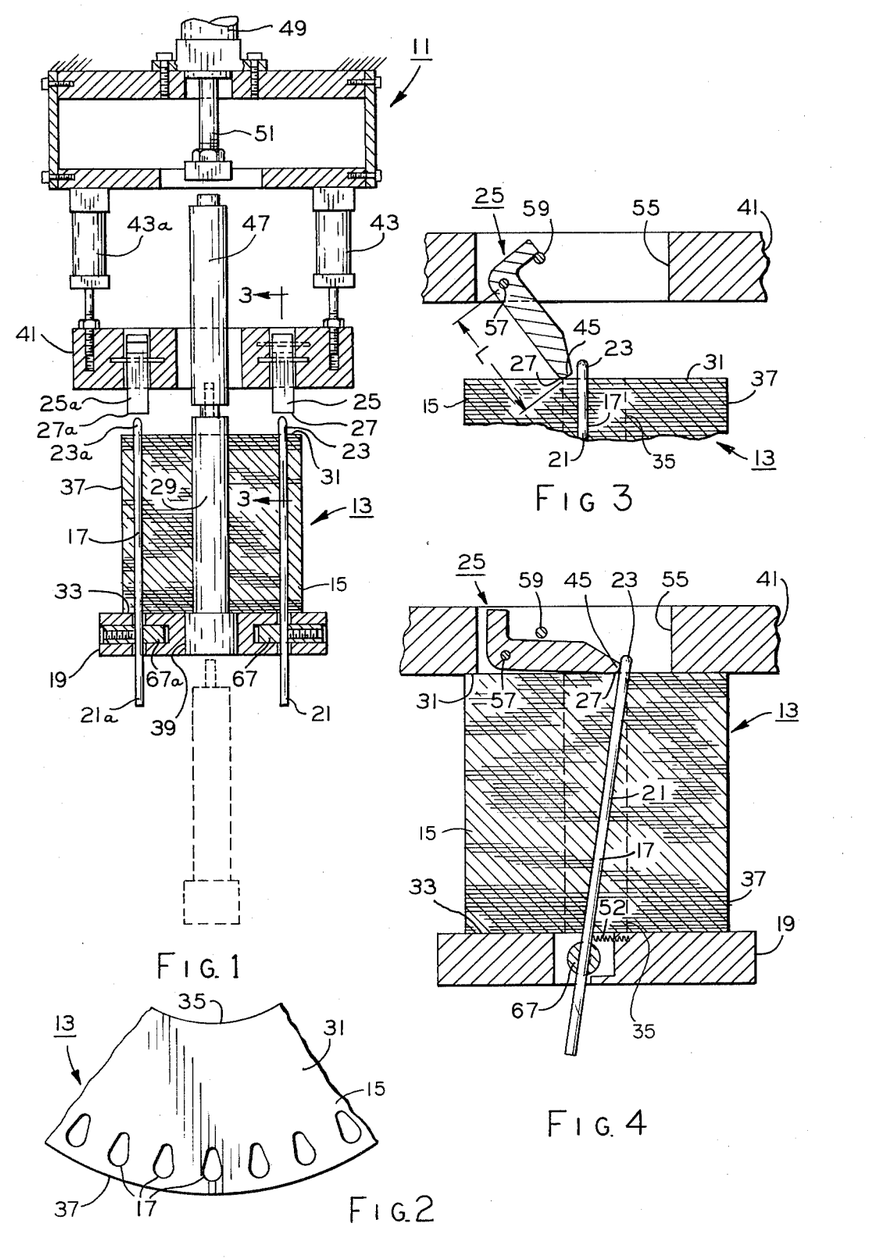
FIG. 1 is a schematic illustration partially in cross-section of apparatus in one form of the invention adapted for imparting skew to a stack of laminations and also illustrating principles which may be practiced in a method of operating such apparatus also in one form of the invention.
FIG. 2 is a greatly enlarged, partial top elevational view of the stack taken from FIG. 1.
FIG. 3 is a partial sectional view taken along line 3—3 of FIG. 1 with the pressure pad thereof advanced toward the stack to illustrate the initial engagement with the stack of a rocker arm carried by the pressure pad.
FIG. 4 is a greatly enlarged partial sectional view illustrating the stack captured between the pressure pad and base plate of FIG. 1 with the rocker arm and the skewing pin pivoted to impart the skew to the stack.
Figure 5:
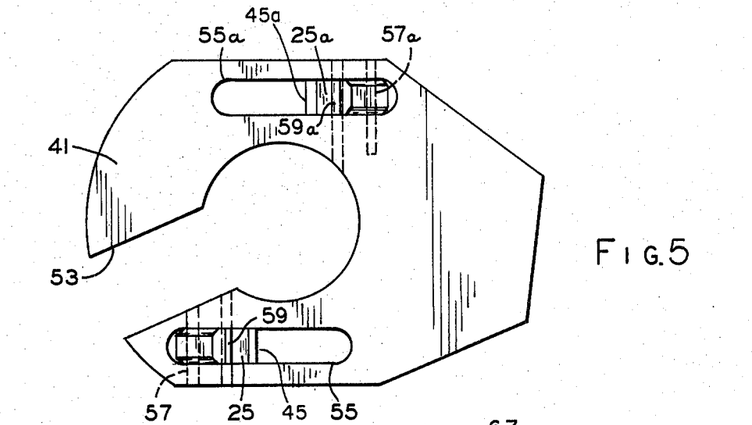
FIG. 5 is a greatly enlarged top elevational view of the pressure pad of FIG. 1 isolated from the apparatus thereof.
Figures 6, 7, 8:
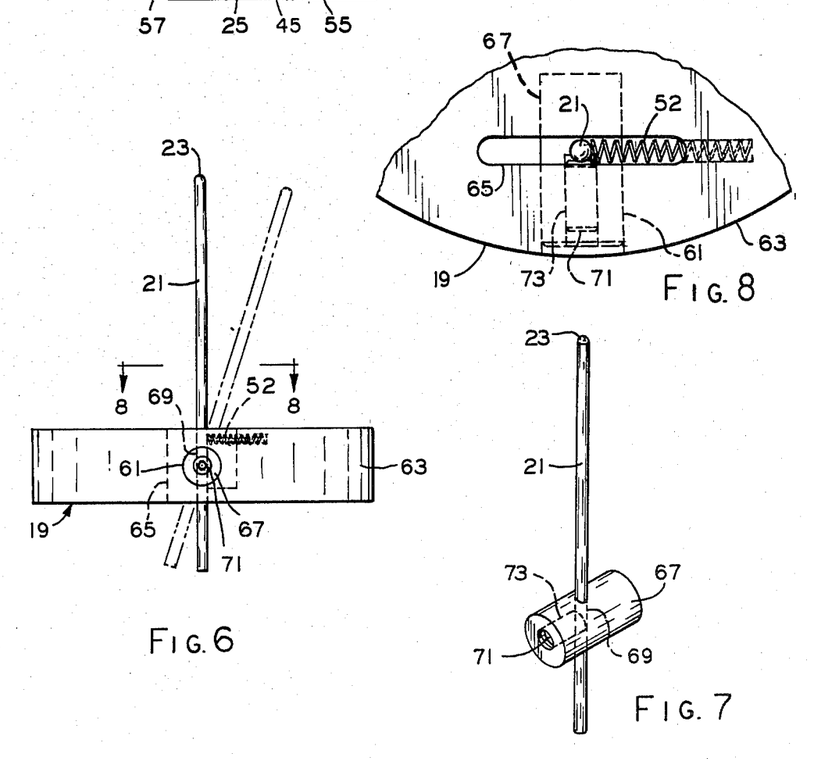
FIG. 6 is a greatly enlarged side elevational view of the base plate and skewing pin of FIG. 1 isolated from the apparatus thereof.
FIG. 7 is an isometric view of the skewing pin of FIG. 6 isolated from the base plate thereof.
FIG. 8 is a sectional view taken along line 8—8 of FIG. 6.

Referring now to the drawings in general, there is illustrated in one form of the invention a method of operating apparatus 11 adapted for skewing a stack 13 of ferromagnetic laminations 15 with the stack having a plurality of openings or passages 17 therethrough (FIGS. 1–4). Apparatus 11 includes seating or supporting means, such as a base plate 19 or the like for instance, for supporting stack 13, and means, such as a pair of skewing pins 21, 21a or the like for instance, pivotally associated with the base plate or seating means and extending through respective ones of passages 17 for skewing the stack and having a pair of free ends or free end portions 23, 23a protruding from the passages beyond the stack when it is supported on the base plate (FIGS. 1, 4 and 6). Apparatus 11 further includes rocker arm means or camming means 25, 25a arranged for reciprocal and pivotal movement with respect to stack 13 (FIGS. 1 and 3–5). In this method, rocker arms or rocker arm means 25, 25a are moved or otherwise advanced in one direction generally toward stack 13, and respective parts or portions 27, 27a of the rocker arms are engaged or otherwise associated with the stack at least adjacent free ends 23, 23a of skewing pins 21, 21a to initiate the pivotal rotational or camming movement of the rocker arms (FIG. 3). Rocker arms 25, 25a are further pivoted, rotated or cammed into driving or abutting engagement with free ends 23, 23a of skewing pins 21, 21a to effect their pivotal displacements thereby to skew stack 13, and engagement parts 27, 27a of the rocker arms are maintained in their engagement with the stack at least during the pivotal displacements of the skewing pins by the rocker arms, respectively (FIG. 4).

More particularly and with specific reference to FIGS. 1–4, laminations 15 may be arranged or otherwise stacked or placed in alignment with each other on means, such as a mandrel 29 or the like for instance, for assembly of the laminations into stack 13 thereof with the stack having a preselected or predetermined height or length between a pair of opposite end faces 31, 33 thereof. Of course, when laminations 15 of stack 13 are so arranged on assembly means or mandrel 29, a generally central opening in each lamination is located or otherwise aligned about the mandrel thereby to define a bore 35 through the stack, and the openings in the laminations defining passage 17 through the stack are also aligned or otherwise located with respect to each other. Thus, with stack 13 so assembled on mandrel 29, passages 17 and bore 35 extend generally axially through the stack intersecting with opposite end faces 31, 33 thereof, and passages 17 are adjacently spaced from a peripheral portion or surface 37 of the stack interposed between the opposite end faces thereof. While passages 17 are illustrated for purposes of disclosure as having a particular shape and as being spaced from peripheral portion 37 of stack 13, it is, of course, contemplated that other passages having different shapes and/or extending through or across the stack at different locations, such as grooves or slots or the like in the peripheral portion of the stack for instance, may be utilized within the scope of the invention so as to meet at least some of the objects thereof. Furthermore, although the skewing of stack 11 is discussed herein for purposes of clarity as being performed utilizing a pair of skewing pins 21, 21a, such skewing of the stack has been effected by apparatus 11 utilizing as few as only one skewing pin and as many as four skewing pins; however, it is contemplated that any desired number of skewing pins and accompanying means for effecting the pivotal movement thereof may be utilized to impart skew to a lamination stack within the scope of the invention so as to meet at least some of the objects thereof.

Upon the assembly of stack 13 on mandrel 29, as discussed above, the stack and mandrel is disposed or otherwise placed in a preselected position on base plate 19 of apparatus 11, and in this preselected position, opposite end face 33 of the stack is seated or otherwise located on the base plate while the mandrel is aligned or otherwise located with respect to a generally central opening 39 through the base plate. During this placement of stack 13 and mandrel 29 with respect to base plate 29, skewing pins 21, 21a are inserted or otherwise led into passages 17 and extended or otherwise passed therethrough so that free ends 23, 23a of the skewing pins protrude from the passages beyond opposite end face 31 of the stack when it is seated on the base plate.

Rocker arms 25, 25a are pivotally mounted in means, such as a pressure pad 41 or the like for instance, for carrying them, and reciprocally movable means, such as a pair of double acting air or hydraulic cylinders 43, 43a or the like for instance, are operatively associated with pressure pad or carrying means 41 to effect protractive movement or advancement thereof in one direction, i.e., downwardly as best seen in FIG. 1, toward engagement or abutment with end face 31 of stack 13 upon the actuation of the reciprocally movable means or cylinders 43, 43a. During the advancement of pressure pad 41, engagement parts 27, 27a of rocker arms 25, 25a are associated or otherwise slidably abutted with opposite end face 31 of stack 13 at least adjacent free ends 23, 23a of skewing pins 21, 21a extending beyond the opposite end face of the stack. In response to the abutment of rocker arms 25, 25a with opposite end face 31 of stack 13, pivoting of the rocker arms generally about the pivotal arrangement thereof with pressure pad 41 is initiated, and a pair of camming or abutment portions 45, 45a on the rocker arms at least adjacent engagement portions 27, 27a thereof are driven or otherwise moved into camming or driving engagement with free ends 23, 23a of skewing pins 21, 21a. Upon further advancement of pressure pad 41 with the further pivoting of rocker arms 25, 25a, the engagement between camming portions 45, 45a thereof and free ends 23, 23a of skewing pins 21, 21a pivots, cams or otherwise displaces the skewing pins from an at-rest or assembly position thereof toward a displaced position (shown in dotted outline in FIG. 6) generally about the sections of the skewing pins pivotally arranged with base plate 19. In response to this driven pivotal movement of skewing pins 21, 21a toward their displaced positions, rotation or skewing of laminations 15 in stack 13 is effected through the driving or abutting engagement of the skewing pins therewith within passages 17 of the stack. The advancement of pressure pad 41 is terminated upon the engagement thereof with end face 31 of stack 13 thereby to capture or otherwise abuttingly engage the stack between the pressure pad and base plate 19, and when the stack is so captured, the pivoting of rocker arms 25, 25a about the pivotally supported portion thereof on the pressure pad is, of course, also terminated thereby to define the aforementioned displaced positions into which skewing pins 21, 21a are displaced in response to the driving engagement between camming portions 45, 45a of the rocker arms and free ends 23, 23a of the skewing pins. It may be noted that engagement parts 27, 27a of rocker arms 25, 25a are slidably engaged with end face 31 of stack 13 at least during the pivotal displacement of skewing pins 21, 21a from their at-rest positions to the displaced to the displaced positions thereof, and the amount of skew imparted to the stack during the pivotal displacement of the skewing pins is, of course, directly related to or correlative with the pivot arm length L of the rocker arms, as discussed in greater detail hereinafter. It may be noted that the skewing force applied by rocker arms 25, 25a is exerted on free ends 23, 23a of skewing pins 21, 21a a preselected distance or lever arm from the pivotal arrangement of the skewing pins with base plate 19, and it is believed that the exertion of the skewing force on the skewing pin free ends imparts an accurate angle of skew to stack 13, obviates or at least reduces deflection of the skewing pins during such skewing operations and at least reduces skewing pin breakage during such skewing operation. While the operation of both rocker arms 25, 25a to effect skewing of stack 13 are discussed hereinabove, such operation of only rocker arm 25 is shown in FIGS. 3 and 4 for the sake of drawing simplicity.

Means, such as a tight pin 47 or the like for instance, for displacement preventing engagement with laminations 15 of stack 13 may be associated, engaged or otherwise located in alignment with mandrel 29 at any time subsequent to its disposition on base plate 19, as previously discussed. For instance, an operator may place or otherwise assemble tight pin or displacement preventing engagement means 47 in position upon the upper end of mandrel 29, as best seen in FIG. 1; however, it is contemplated that the tight pin may be automatically assembled by suitable means (not shown) with the mandrel within the scope of the invention so as to meet at least some of the objects thereof. Thus, after stack 13 has been captured between base plate 19 and pressure pad 41, another reciprocally movable means, such as double acting air or hydraulic cylinder 49 having a ram 51 associated therewith or the like for instance, is actuated or protractively moved in one direction, i.e., downwardly as best seen in FIG. 1, to engage the ram with tight pin 47 and drive or otherwise insert it into bore 35 of the stack into displacement preventing engagement with laminations 15 thereof with the tight pin displacing mandrel 29 from the stack bore through opening 39 in the base plate. Thus, the engagement of tight pin 47 with laminations 15 of stack 13 within bore 35 thereof maintains or retains the laminations in their skewed positions so that the stack may be moved from apparatus 11 to another work station or the like for instance (not shown) without disturbing the preselected skew angle of the laminations in the stack.

When tight pin 47 is associated with stack 13 as discussed above, cylinders 43, 43a and 49 may be reactuated or retractively moved in the opposite direction, i.e., upwardly as best seen in FIG. 1, displacing pressure pad 41 from end face 31 of the stack and ram 51 from tight pin 49. When pressure pad 41 is retracted with cylinders 43, 43a upon the reactuation thereof, rocker arms 25, 25a are, of course, conjointly movable with the pressure pad thereby to interrupt the driving or camming engagement between camming portions 45, 45a on the rocker arms and free ends 23, 23a of skewing pins 21, 21a in the displaced positions thereof. Thus, with pressure pad 41 having been retracted to its at-rest position, stack 13 may be removed or otherwise displaced from its preselected positions seated on base plate 19 with tight pin 47 secured in the displacement preventing engagement thereof with laminations 15 of the stack, and upon such removal of the stack from the base plate, passages 17 of the stack are withdrawn or otherwise led from skewing pins 21, 21a in the displaced positions thereof. Resilient means, such as a pair of springs 52, 52a or the like for instance, are provided in base plate 19 for biasing or otherwise returning skewing pins 21, 21a from the displaced positions to its at-rest positions thereof, as best seen in FIGS. 6 and 7, when stack 13 is disassociated from skewing pins 21, 21a and base plate 19. Albeit not shown for purposes of drawing simplicity, another resilient means or spring 52a is associated with skewing pin 21a to likewise effect its return from the displaced position to the at-rest position thereof in the same manner discussed above with respect to skewing pin 21. While springs 52, 52a are utilized to return skewing pins 21, 21a to their at-rest position, as discussed above, it is contemplated that other means may also be employed to effect such return movement of the skewing pins within the scope of the invention so as to meet at least some of the objects thereof.

Albeit not shown for purposes of drawing and disclosure simplicity, base plate 19 may be moved from its preselected position, as best seen in FIG. 1, in order to remove stack 13 after it has been skewed in the manner discussed hereinabove. For instance, it is believed that base plate 19 may be arranged on a carrousel or the like for instance which is operable to place or otherwise locate base plate 19 with stack 13 seated thereon in the preselected position of the base plate with respect to pressure pad 41; however, it is believed that other means for locating the base plate may also be utilized with apparatus 11 within the scope of the invention so as to meet at least some of the objects thereof.

With reference again in general to the drawings and recapitulating at least in part with respect to the foregoing, apparatus 11 is adapted for imparting skew to stack 13 of laminations 15 with the stack having opposite end faces 31, 33 and passages 17 therein intersecting with the opposite end faces (FIGS. 1-4). Means, such as base plate 19 or the like for instance, is provided for seating or supporting stack 13, and skewing pins 21, 21a are pivotally or movably mounted to base plate 19 and extend through passages 17 for skewing the stack with the skewing pins including free ends 23, 23a protruding from the passages beyond the stack (FIGS. 1 and 4). Means, such as pressure pad 41 for instance, for reciprocal movement with respect to base plate 19 includes means, such as rocker arms 25, 25a for instance, pivotally arranged with reciprocally movable means or pressure pad 41 for driving engagement with free ends 23, 23a of skewing pins 21, 21a to effect the pivotal movement thereof and impart the skew to stack 13 during at least a part of the movement in one direction of the pressure pad (FIGS. 1 and 3-5).

More particularly and with specific reference to FIGS. 1-5, pressure pad or abutment means 41 is provided with a generally key-hole shaped opening 53 to accommodate the passage thereinto of tight pin 47 when it is assembled with mandrel 29, as previously discussed, and a pair of means, such as slots 55, 55a or the like for instance, for receiving or accommodating rocker arms 25, 25a are also provided through the pressure pad generally adjacent the key-hole shaped opening in spaced apart relation therewith. Rocker arms 25, 25a are pivotally or rotatably mounted to pressure pad 41 within slots 55, 55a thereof by a pair of pivot pins 57, 57a, and a pair of means, such as stop or positioning pins 59, 59a or the like for instance, on the pressure pad extend across the slots thereof for engagement or abutment with the rocker arms to define the at-rest positions thereof, respectively. Thus, when pressure pad 41 is in its retracted position, as previously discussed, the pivotal arrangement of portions of rocker arms 25, 25a on pivot pins 57, 57a causes the rocker arms to rotate about the pivot pins to the at-rest positions thereof into abutment or positioning engagement with stop pins 59, 59a, and in this at-rest position, camming portions 45, 45a which include engagement parts 27, 27a of the rocker arms depend from the slots in the pressure pad generally toward upper end face 31 of stack 13 or base plate 19, as best seen in FIGS. 1 and 3. Thus, the pivotal arrangement of rocker arms 25, 25a with pressure pad 41 locates or otherwise positions camming portions 45, 45a of the rocker arms with respect to free ends 23, 23a of skewing pins 21, 21a in the at-rest positions thereof protruding through passages 17 of stack 13 seated in the preselected positions thereof on base plate 19 and assembled with mandrel 29. When pressure pad 41 is protractively advanced toward engagement with end face 31 of stack 13, as discussed hereinabove, engagement parts 27, 27a of rocker arms 25, 25a slidably engage the stack end face to initiate the pivoting of the rocker arms from their at-rest positions about pivot pins 57, 57a disengaging the rocker arms from stop pins 59, 59a, and further pivoting of the rocker arm drivingly engages camming portions 45, 45a thereof with free ends 23, 23a of skewing pins 21, 21a to impart the skew to laminations 15 of stack 13. It may be noted that rocker arms 25, 25a are provided with a pivot length L between the center point of pivot pins 57, 57a and the free ends of camming portions 45, 45a of the rocker arms, and this pivot length L is preselected in order to impart a preselected amount of skew or preselected angle of skew to stack 13 when the rocker arms are pivoted from their at-rest positions to their pivotally displaced positions, as shown in FIGS. 3 and 4, generally as pressure pad 41 is advanced into engagement with end face 31 of stack 13, as discussed hereinbefore.

As mentioned hereinabove, skewing pins 21, 21a are pivotally and adjustably arranged with base plate 19, and for the sake of drawing simplicity this arrangement is illustrated in FIGS. 6-8 only for skewing pin 21; however, albeit not shown, the like pivotal and adjustable arrangement for skewing pin 21a will be included in the following discussion. Base plate 19 is provided with a pair of openings or bores 61, 61a in a peripheral portion 63 thereof, and the bores are intersected by a pair of slots 65, 65a which extend through the base plate. Means, such as a pair of pivot cylinders or pins 67, 67a or the like for instance, are pivotally or rotatably received in bores 61, 61a of base plate 19 for pivotally mounting therein skewing pins 21, 21a, and means, such as a pair of passages 69, 69a or the like for instance, for receiving skewing pins 21, 21a are provided in the pivotally mounting means or pivot cylinders 67, 67a. Thus, when skewing pins 21, 21a are disposed in receiving means or passages 69, 69a of pivot cylinders 67, 67a, the skewing pins extend through receiving means or slots 65, 65a in base plate 19, and springs 52, 52a which are seated in the base plate extend into the slots into biasing engagement with the skewing pins urging them toward their at-rest positions, respectively. Means, such as a pair of set screws 71, 71a or the like for instance, are associated with pivot cylinders 67, 67a and sections of skewing pins 21, 21a received in passages 69, 69a thereof for adjusting the spacing of free ends 23, 23a of the skewing pins with respect to base plate 19. Adjusting means or set screws 71, 71a are threadedly or adjustably received in pairs of threaded bores 73, 73a provided in pivot cylinders 69, 69a so as to intersect with passages 67, 67a thereof, and the set screws are adjustably or threadedly moved into displacement preventing engagement with the sections of skewing pins 21, 21a within the passages thereby to maintain the spacing preselected between the free ends 23, 23a of the skewing pins and base plate 19, as previously mentioned. Thus, by adjustably moving skewing pins 21, 21a in passages 69, 69a of pivot cylinders 67, 67a, the preselected spacing between free ends 23, 23a of the skewing pins and base plate 19 may be adjusted to accommodate stacks having a different stack height or length other than that of stack 13. However, it is contemplated that other skewing pins having a length which is not adjustable may be pivotally associated with base plate 19 with such length being great enough to accommodate lamination stacks of various heights contemplated for production on apparatus 11 within the scope of the invention so as to meet at least some of the objects thereof. As previously mentioned, apparatus 11 has been operated with one, two and four skewing pins associated therewith, and it is believed that any number of skewing pins may be utilized in such apparatus for imparting skew to stack 13 within the scope of the invention so as to meet at least some of the objects thereof.

From the foregoing, it is now apparent that a novel apparatus 11 and a novel method of operating such apparatus have been presented meeting the objects and advantages set out hereinbefore, as well as others, and that changes as to the precise arrangement, shapes, details and connections of the constructions illustrated herein by way of example, as well as the precise steps and order thereof for the method, may be made by those having ordinary skill in the art without departing from the spirit of the invention or the scope thereof as defined by the claims which follow.

What I claim as new and desire to secure by Letters Patent of the United States is:

1. A method of operating apparatus adapted to effect the skewing of a plurality of laminations of a stack thereof with each lamination having a generally central opening and at least another opening therethrough, means for the assembly thereon of the laminations in the stack thereof, the apparatus including a base plate, at least one skewing pin having a section thereof pivotally arranged with the base plate and a free end spaced therefrom, means for adjusting the at least one skewing pin with respect to the base plate, a pressure pad, at least one rocker arm having a portion pivotally supported on the pressure pad and a camming portion predeterminately spaced from the pivotally supported portion of the at least one rocker arm, reciprocally movable means for carrying the pressure pad, a tight pin, and another reciprocally movable means for driving engagement with the tight pin, the method comprising the steps of:

adjusting the adjusting means and predeterminately spacing the free end of the at least one skewing pin generally in an at-rest position thereof from the base plate;

arranging the laminations on the assembly means into the stack thereof having a preselected stack height less than the predetermined spacing between the free end of the at least one skewing pin and the base plate and locating the central opening and the at least another opening of the laminations to define a generally axially extending bore and at least one generally axially extending passage through the stack, respectively;

seating one of the opposite ends of the stack in a preselected position on the base plate while the stack is arranged on the assembly means and extending the at least one skewing pin in the at-rest position thereof through the at least one passage in the stack so that the free end of the at least one skewing pin protrudes beyond the other of the opposite ends of the stack when it is seated on the base plate;

associating the tight pin generally in aligned relation with the assembly means;

actuating the first named reciprocally movable means in one direction and advancing the pressure pad toward the other opposite end of the pressure pad;

associating a part of the camming portion of the at least one rocker arm with the other opposite end of the stack as the pressure pad is advanced theretoward by the first named reciprocally movable means;

pivoting the at least one rocker arm generally about the pivotally supported portion thereof with respect to the pressure pad in response to the association of the camming portion part of the at least one rocker arm with the other opposite end of the stack as the pressure pad is advanced theretoward by the first named reciprocally movable means and driving the camming portion of the at least one rocker arm into driving engagement with the free end of the at least one skewing pin protruding beyond the other opposite end of the stack;

displacing the at least one skewing pin pivotally from its at-rest position toward a displaced position generally about the section thereof pivotally arranged with the base plate in response to the driving engagement of the camming portion of the at least one rocker arm with the free end of the at least one skewing pin and effecting the rotation of at least some of the laminations of the stack through the engagement of the at least one skewing pin therewith within the at least one passage of the stack in response to the pivotal displacement of the at least one skewing pin toward its displaced position;

engaging the pressure pad with the other opposite end of the stack thereby to capture it between the pressure pad and the base plate upon the continued advancement of the pressure pad by the first named reciprocally movable means and terminating the pivoting of the at least one rocker arm about its pivotally supported portion and also the pivotal displacement of the at least one skewing pin toward its displaced position in response to the driving engagement between the camming portion of the at least one rocker arm and the free end of the at least one skewing pin;

actuating the another reciprocally movable means in the one direction into the driving engagement with the tight pin and inserting the tight pin into the bore of the stack into displacement preventing engagement with the laminations thereof with the tight pin displacing the assembly means from the stack;

reactuating the first named and another reciprocally movable means in another direction opposite the one direction and displacing the pressure pad from the other opposite end of the stack and the another reciprocally movable means from the tight pin, respectively;

interrupting the driving engagement between the camming portion of the at least one rocker arm and the free end of the least one skewing pin in its displaced position generally upon the displacement of the pressure pad from the opposite end of the stack;

removing the stack from its preselected position seated on the base plate with the tight pin in the displacement preventing engagement thereof within the bore of the stack and withdrawing the at least one passage of the lamination stack from its position about the at least one skewing pin in the displaced position thereof generally as the stack is removed from the base plate; and returning the at least one skewing pin from its displaced position to the at-rest position thereof.

2. A method of operating apparatus for skewing a stack of laminations with the stack including a pair of opposite ends, a peripheral portion between the opposite ends, at least one opening between the opposite ends and at least adjacent the peripheral portion, and a generally central opening between the opposite ends, the apparatus including a base plate, at least one skewing pin pivotally mounted with the base plate so as to be pivotally movable between an at-rest position and a displaced position, a pressure pad, and at least one cam pivotally mounted to the pressure pad, the method comprising the steps of:

seating one of the opposite ends of the stack on the base plate and extending the at least one skewing pin through the at least one opening with the free end of the at least one skewing pin protruding from the at least one opening beyond the other of the opposite ends of the stack;

advancing the pressure pad in a direction generally toward the other opposite end of the stack when the stack is seated on the base plate; and engaging the at least one cam with the other opposite end of the stack at least generally adjacent the free end of the at least one skewing pin protruding therebeyond and pivoting the at least one cam about the pivotal mounting thereof with the pressure pad into driving engagement with the free end of the at least one skewing pin to displace the at least one skewing pin from the at-rest position toward the displaced position thereof effecting the skewing of at least some of the laminations of the stack through the engagement therewith of the at least one skewing pin within the at least one opening at least as the pressure pad is advanced toward the other opposite end of the stack.

3. The method as set forth in claim 2 wherein the engaging and pivoting step includes pivoting the at least one skewing pin about the pivotal mounting thereof with the base plate upon the displacement of the at least one skewing pin from its at-rest position toward its displaced position.

4. The method as set forth in claim 2 comprising the additional step of moving the pressure pad into engagement with the other opposite end of the stack to generally terminate the advance of the pressure pad.

5. The method as set forth in claim 4 comprising the further additional step of terminating the pivoting of the at least one cam about the pivotal mounting thereof with the pressure pad and the displacement of the at least one skewing pin toward its displaced position generally when the pressure pad is moved into engagement with the other opposite end of the stack.

6. The method as set forth in claim 2 comprising the additional step of capturing the stack between the base plate and the pressure pad by advancing the pressure pad into engagement with the other opposite end of the stack.

7. The method as set forth in claim 6 comprising the further additional step of retaining the skewed laminations of the stack generally against displacement movement relative to each other generally about the central opening of the stack.

8. The method as set forth in claim 7 wherein the apparatus includes means for displacement preventing engagement with the laminations of the stack, and wherein the retaining step includes inserting the displacement preventing engagement means into the central opening of the stack into engagement with the skewed laminations thereof.

9. A method of operating apparatus adapted for skewing a stack of laminations with the stack having a pair of opposite end faces, and at least one passage means across the stack for intersection with the opposite end faces thereof, respectively, the apparatus including means for supporting the stack, at least one means associated with the supporting means and pivotally displaceable between a pair of positions for skewing the stack, and at least one rocker arm means for camming the skewing means with the rocker arm means being pivotally arranged with a means for carrying it, the method comprising the steps of:

disposing one of the opposite end faces of the stack in a preselected seated position with respect to the supporting means therefor and passing the at least one skewing means in one of its positions through the at least one passage means of the stack with a part of the at least one skewing means extending beyond the other of the opposite end faces of the stack; and associating the at least one rocker arm means with the other opposite end face of the stack to initiate the pivoting of the at least one rocker arm means generally about its pivotal arrangement with the carrying means therefor and moving the at least one rocker arm means during its pivoting and in its association with the other opposite face of the stack to engage the at least one skewing means part and pivotally displace the at least one skewing means from one position toward the other of the positions thereof with the pivotal displacement of the at least one skewing means effecting the skewing of at least some of the laminations of the stack.

10. The method as set forth in claim 9 comprising the intermediate step of advancing the carrying means generally toward the other opposite end face of the stack.

11. The method as set forth in claim 9 comprising the additional step of capturing the one and other opposite faces of the stack between the supporting means and carrying means, respectively.

12. The method as set forth in claim 11 wherein the apparatus further includes means for displacement preventing engagement with lamination of the stack, and further comprising the additional step of associating the displacement preventing means with the laminations of the stack so as to maintain at least the at least some laminations skewed in the stack.

13. A method of operating apparatus adapted for skewing a stack of laminations with the stack having at least one passage therethrough, the apparatus including seating means for supporting the stack, at least one means pivotally associated with the seating means and extending through the at least one passage for skewing the stack and with the at least one skewing means having a free end protruding from the at least one passage beyond the stack when it is supported on the seating means, and at least one rocker arm means arranged for reciprocal and pivotal movement with respect to the stack, the method comprising:

moving the at least one rocker arm means in one direction toward the stack and engaging a pair of the at least one rocker arm means with the stack at least adjacent the free end of the at least one skewing means to initiate the pivotal movement of the at least one rocker arm means; and  pivoting the at least one rocker arm means into driving engagement with the free end of the at least one skewing means to effect its pivotal displacement thereby to skew the stack and maintaining the at least one rocker arm means part in its engagement with the stack at least during the pivotal displacement of the at least one skewing means by the at least one rocker arm means.

14. Apparatus adapted for imparting skew to a stack of laminations having a pair of opposite end faces with at least one opening across the stack between the opposite end faces thereof, the apparatus comprising:

a mandrel with the stack assembled thereon;

a seat supporting one of the opposite end faces of the stack including another opening through the seat adapted to receive the mandrel when the stack is supported on the seat;

at least one skewing pin movable between an at-rest position and a displaced position and disposed in the first named opening of the stack when it is supported in said seat, said at least one skewing pin including a free end protruding beyond the other of the opposite end faces of the stack when said at least one skewing pin is disposed in the first named opening thereof;

means for pivotally mounting said at least one skewing pin with said seat;

means associated with said pivotally mounting means and said at least one skewing pin for adjusting the spacing of said free end thereof with respect to said seat;

a pressure pad including at least one slot therein, at least one rocker arm movable at least in part within said slot having a pivoted end portion pivotally mounted with said pressure pad within said at least one slot and a camming end portion predeterminately spaced from said pivoted end portion;

means for reciprocally actuating said pressure pad, said reciprocally actuating means being operable to advance said pressure pad generally in one direction toward the other opposite end face of the stack when it is supported on said seat so as to initially engage said camming end portion with the opposite end face of the stack at least adjacent the free end of said at least one skewing pin thereby to initiate the pivotal movement of said at least one rocker arm about its pivoted end portion and thereafter drivingly engaged said camming end portion with said free end of said at least one skewing pin to effect pivotal movement from its at-rest position toward its displaced position about its pivotally mounting means thereby to impart the skew to the stack at least upon the advancement of said pressure pad into abutment with the other opposite end face of the stack;

tight pin means associated with said mandrel and adapted for displacement preventing engagement with said stack; and  means operable generally for driving said tight pin means into the displacement preventing engagement with the skewed laminations of the stack and for displacing said mandrel therefrom through said another opening in said seat.

15. Apparatus adapted for imparting skew to a stack of laminations having a pair of opposite end faces and at least one opening therein intersecting with the opposite end faces, the apparatus comprising:

means for supporting the stack;

means pivotally mounted to said supporting means and extending through the at least one opening of the stack for skewing it including a free end protruding from the at least one opening beyond the stack;

means for reciprocal movement with respect to said supporting means including at least one means pivotally arranged with said reciprocal movement means for driving engagement with said free end of said at least one skewing means to effect the pivotal movement thereof and impart the skew to the stack during at least a part of the movement in one direction of said reciprocal movement means.

16. The apparatus as set forth in claim 15 further comprising gripping means for displacement preventing engagement with the stack when the skew is imparted thereto.

17. The apparatus as set forth in claim 16 further comprising means for actuating the gripping means into the displacement preventing engagement thereof with the stack.

18. The apparatus as set forth in claim 17 further comprising alignment means for the assembly thereon of the stack and associated with said seating means when said stack is supported thereon, said alignment means being displaced from the stack when said gripping means is actuated into the displacement preventing engagement thereof with the stack by said actuating means.

19. The apparatus as set forth in claim 15 wherein said driving engagement means comprises a rocker arm having a pair of opposite end portions, one of said opposite end portions being disposed in the pivotal arrangement with said reciprocal movement means and the other of said opposite end portions drivingly engaged with said free end of said at least one skewing means upon the movement in the one direction of said reciprocal movement means.

20. Apparatus adapted for imparting skew to a stack of laminations having a pair of opposite end faces with at least one opening across the stack between the opposite end faces thereof, the apparatus comprising:

supporting means for seating one of the opposite end faces of the stack;

at least one means for skewing the stack pivotally associated with said supporting and extending at least in part through the at least one opening of the stack when it is seated on said supporting means, said at least one skewing means having a free end protruding beyond the other of the opposite end faces of the stack; and abutment means for movement into engagement with the other opposite end face of the stack when it is seated on said supporting means including at least one rocker arm means arranged for pivotal movement on said abutment means, and camming means on said at least one rocker arm means for driving engagement with said free end of said at least one skewing means, said at least one rocker arm means being initially abutted with the other opposite end of the stack to initiate the pivotal movement of said at least one rocker arm means upon the movement of said abutment means toward the engagement thereof with the other opposite end of the stack and said camming means being drivingly engaged with said free end of said at least one skewing means to effect its pivotal movement with respect to said supporting means thereby to impart the skew to the stack at least upon the abutment of said at least one rocker arm means in the engagement thereof with the other opposite end face of the stack.

* * * * *